Feb. 20, 1923.

A. J. HIX

COMMUTATOR

Filed July 13, 1922

1,445,885

Inventor
Andrew J. Hix
By Horace C. _____
Attorney

Patented Feb. 20, 1923.

1,445,885

UNITED STATES PATENT OFFICE.

ANDREW J. HIX, OF HELLIER, KENTUCKY.

COMMUTATOR.

Application filed July 13, 1922. Serial No. 574,746.

*To all whom it may concern:*

Be it known that I, ANDREW J. HIX, a citizen of the United States, residing at Hellier, in the county of Pike, State of Kentucky, have invented certain new and useful Improvements in Commutators; and I do hereby declare the following to be a full, clear, and exact description of the invention, such as will enable others skilled in the art to which it appertains to make and use the same.

This invention relates to new and useful improvements in commutators and particularly to methods of securing the leads to the segments thereof.

In the ordinary construction of commutators, the end of one coil, of an armature, and the beginning of the next coil are soldered within a slot cut in the metal segment of the commutator, but in soldering the said ends it is difficult to cause the solder to reach the wire end which is in the inner portion of the slot.

It is the particular object of this invention to provide a commutator of such construction that the solder may flow to all parts surrounding the wire ends, within the slot of the segment, thereby producing a more perfect connection between the wire and the segment.

Other objects and advantages will be apparent from the following description when taken in connection with the accompanying drawing.

Figure 1:
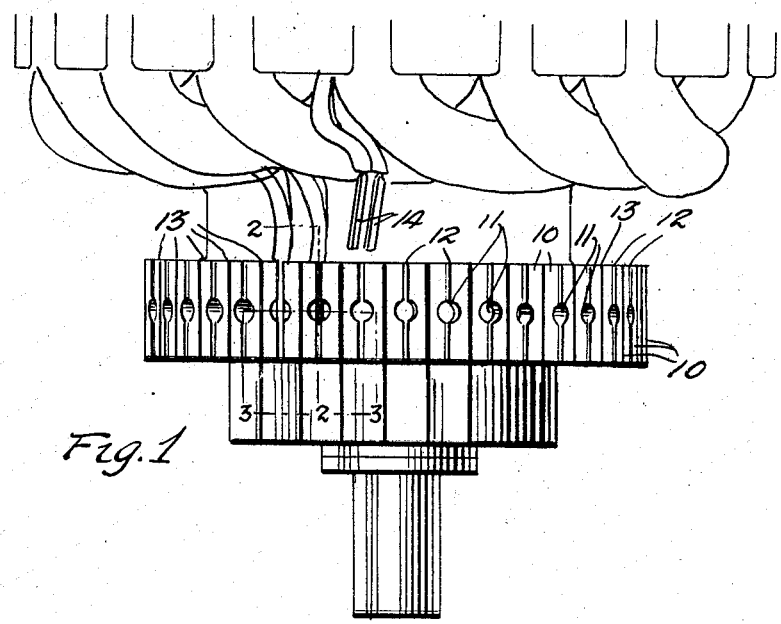
Figure 1 is a plan view of a section of a commutator made in accordance with the invention, and showing two wire ends or leads about to be inserted in the slot of a segment, two wire ends disposed in a slot, and two wire ends disposed in a slot and held by solder.
Figure 2:
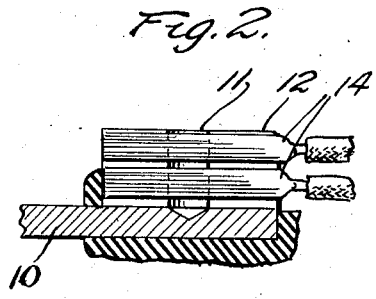
Figure 2 is a longitudinal section through the commutator, on the line 2—2 of Figure 1.
Figure 3:
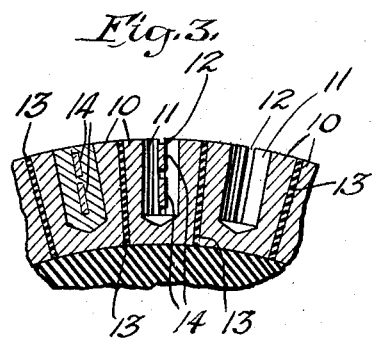
Figure 3 is a transverse sectional view on the line 3—3 of Figure 1.

Referring particularly to the accompanying drawing 10 represents a number of metal segments of a commutator. Bored radially inward through the center of each segment 10 is an opening 11, and formed transversely through the center of each segment, and the center of the opening 11, is a slot or kerf 12. Disposed in the slots or spaces 12, between the segments, are the mica insulator plates 13.

Disposed in the slot or kerf 12 are the inner and outer wire ends 14, the same being flat as shown. Ordinarily no opening, such as shown at 11, is formed in a commutator segment, and for this reason the solder will not flow readily to the inner wire end or lead, but in the present construction when solder is poured into the openings 11 it will run into the inner end of the opening and flow all around the inner lead, as well as around the outer lead, with the result that the leads will be firmly held within the slot or kerf, and a perfect metallic connection made between the leads and the commutator segment.

It will, of course, be understood that the holes 11 are bored in the segments, after the segments have been assembled in their ring formation, and before the slots or kerf 12 are sawed through the segments.

There has thus been provided a commutator construction wherein the soldering of the leads is more easily done, than in devices of this character heretofore, and wherein a more perfect metallic and electrical connection is made between the leads and the segments of the commutator.

What is claimed is:

1. The method of securing the armature leads in the commutator segments of a generator or motor, consisting in boring an opening through the peripheral face of each segment radially with respect to the commutator, sawing a kerf transversely through the face of each segment, and pouring solder within the openings around the leads placed in the kerfs.

2. A commutator segment having an opening formed through its peripheral face, and a kerf formed transversely through its peripheral face centrally of the segment and of the opening.

3. A commutator comprising a number of insulated and spaced segments each of which is formed with an opening for the reception of solder and a transverse kerf for reception of armature leads, the leads being embedded in the solder within the opening and in the kerf.

In testimony whereof, I affix my signature, in the presence of two witnesses.

ANDREW J. HIX.

Witnesses:
R. E. STEPHENSEN,
VEANA CHILDERS.